(No Model.)

D. S. NEIMAN.
OIL FILTER.

No. 320,274. Patented June 16, 1885.

WITNESSES:
Harrison B. Brown
W. L. Stevens

INVENTOR:
Daniel S. Neiman
BY Munn & Co.
ATTORNEYS.

UNITED STATES PATENT OFFICE.

DANIEL S. NEIMAN, OF FARGO, DAKOTA TERRITORY.

OIL-FILTER.

SPECIFICATION forming part of Letters Patent No. 320,274, dated June 16, 1885.

Application filed October 23, 1884. (No model.)

*To all whom it may concern:*

Be it known that I, DANIEL S. NEIMAN, a citizen of the United States, residing at Fargo, in the county of Cass, Dakota Territory, have invented certain new and useful Improvements in Oil-Filters, of which the following is a description.

The object of this invention is to cleanse oil which has been used for lubricating purposes, both from insoluble foreign matter and from surplus water at one continuous operation.

To this end my invention consists in the construction and combination of parts forming a filter, hereinafter described and claimed, reference being had to the accompanying drawings, in which—

Figure 1:
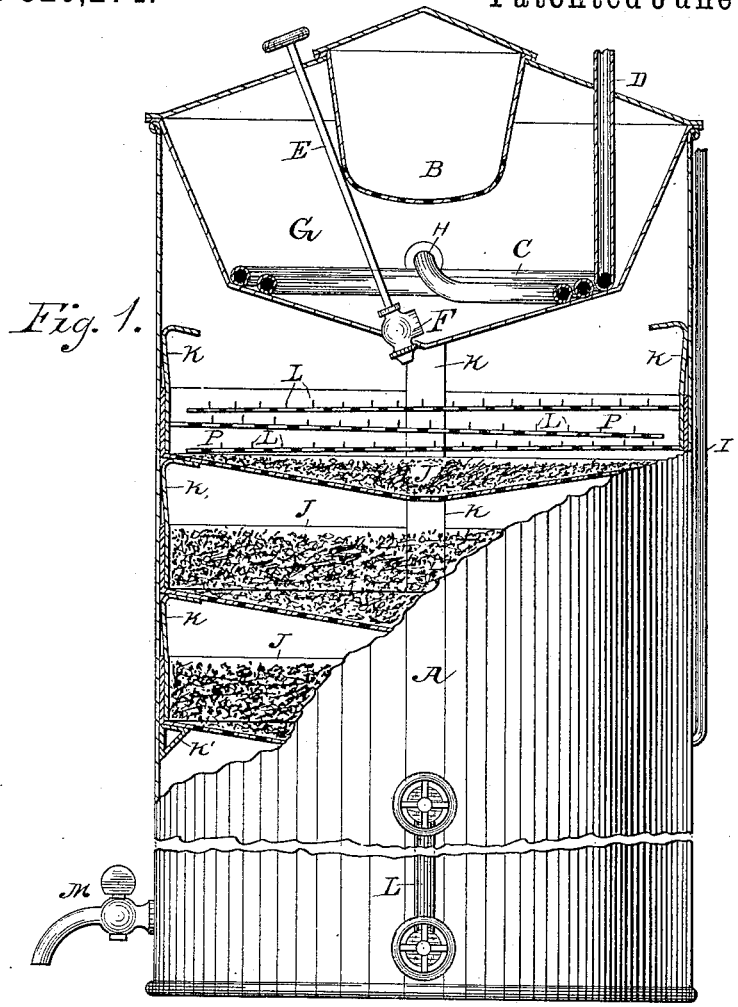
Figure 2:
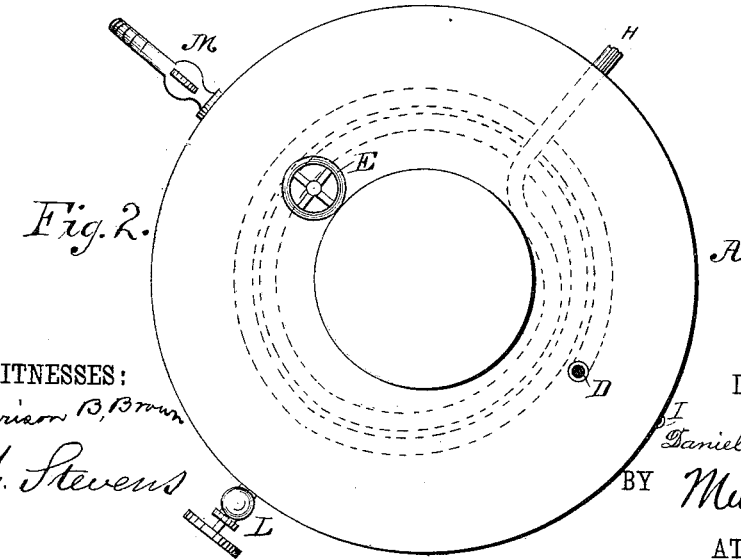

Figure 1 is a side elevation of a filter according to my invention, partly broken away to show the interior; and Fig. 2 is a plan view of the same.

A represents a tank provided with a discharge-faucet, M, and with a glass gage, L, by means of which latter the height and condition of the filtered oil in the tank may be seen.

B is a coarse strainer into which the dirty oil is placed. In passing through this strainer the oil is relieved of coarse particles of dirt.

G is the heating-pan, provided with a coil of pipe, C, into which steam enters at D, and from which it discharges at H, after having imparted most of its heat through the pipe C directly to the oil, which is in contact with the pipe in pan G, having descended thereto through the strainer B. The heating will be continued in the pan G until any water which may be in the oil is driven off, thereby producing two effects—first, the water and light fluids being expanded into vapor and dissipated, the remaining product is a heavier oil possessed of more body, and consequently more valuable for future use; second, the watery fluids being expelled leaves much waste matter to be filtered out, which would otherwise have been held in solution, and would have thus passed through the filter with the oil to deteriorate it; therefore, by first heating the oil to drive off the lighter fluids the subsequent filtration is aided in producing better oil.

F is a stop-cock provided with a handle, E, by means of which the heated oil may be passed into the first filtering-pan, J.

P represents a series of screens of perforated sheet metal or wire-cloth, set a little inclined alternately in opposite directions to screen out coarse matter from the oil. These screens are each provided with a series of partitions, L, standing across the path of the oil to prevent its flowing too quickly down the inclines, to insure the lodgement of all coarse foreign matter in the screens before entering the filtering material, because the screens may be readily removed to be washed. These screens may be at any time removed and substituted by others or quickly rinsed and returned.

J represents a series of pans perforated through their bottoms and filled with filtering material of any suitable character. These pans are provided with lugs K, each to support the pan above. The lower pan rests upon lugs K', fixed to the tank A. Below the lower pan the tank accumulates the oil which passes through the filters and holds it for use. The pans J are duplicates of each other and interchangeable, so that when the filtering material in the top pan becomes foul the pan may be emptied and refilled with clean filtering material and placed below the others to do the finishing while it is fresh and clean. By thus rotating each pan is caused to do all the different grades of service from best to poorest until it is too foul for further use, thus economizing filtering material.

I is an air-tube for the reservoir-chamber, to permit ingress of air while oil is being withdrawn by the faucet M. The heating-pan G being placed within the tank A distributes heat through all the filtering material, thereby keeping the mass sufficiently fluid to assist the oil to flow. As the top is not sealed in any manner, the vapor from the waste water will find its way out without special provision therefor, yet an exit might be provided, if found necessary.

The strainer B being placed above the heat-pipe very thick pasty oil may be assisted by the heat to flow into the filter, thereby saving what would otherwise be lost.

What I claim as my invention, and desire to secure by Letters Patent, is—

1. The combination, with a tank and filtering material therein, of a series of strainers, P, placed one above another in the tank, above the filtering material, and the partitions L therein, the strainers being slanted alternately in opposite directions, as and for the purpose specified.

2. The combination, with a tank, filtering material therein, a pan within the tank, above the filtering material, and a coiled steam-pipe in the pan, of a strainer located above the steam-pipe within the tank, as shown and described.

DANIEL S. NEIMAN.

Witnesses:
CHARLES H. J. BLISS,
GEORGE W. BIRD.